April 1, 1969   H. T. PATTERSON   3,436,288
PROCESS FOR BONDING RUBBER TO POLYESTER STRUCTURES
Filed Jan. 5, 1965

INVENTOR
HUGH T. PATTERSON

BY
ATTORNEY

United States Patent Office 3,436,288
Patented Apr. 1, 1969

3,436,288
PROCESS FOR BONDING RUBBER TO
POLYESTER STRUCTURES
Hugh T. Patterson, Greenville, N.C., assignor to E. I.
du Pont de Nemours and Company, Wilmington, Del., a
corporation of Delaware
Filed Jan. 5, 1965, Ser. No. 423,528
Int. Cl. B29h 7/22; B32b 27/38; C09j
U.S. Cl. 156—142        5 Claims

ABSTRACT OF THE DISCLOSURE

The process for bonding rubber to polyester cords comprising coating the cord with an organic solvent solution containing a specific epoxylated novolak resin and a polyamide resin reaction product of polymeric fat acids having at least two carboxyl groups and polyalkylene polyamines having two primary amine groups and a plurality of secondary amine groups, heating the coated cords to cure the coating, overcoating the structure with a specific latex mixture, drying and curing the overcoating, and then applying and curing a layer of rubber on the coated structure.

---

Figure 1:
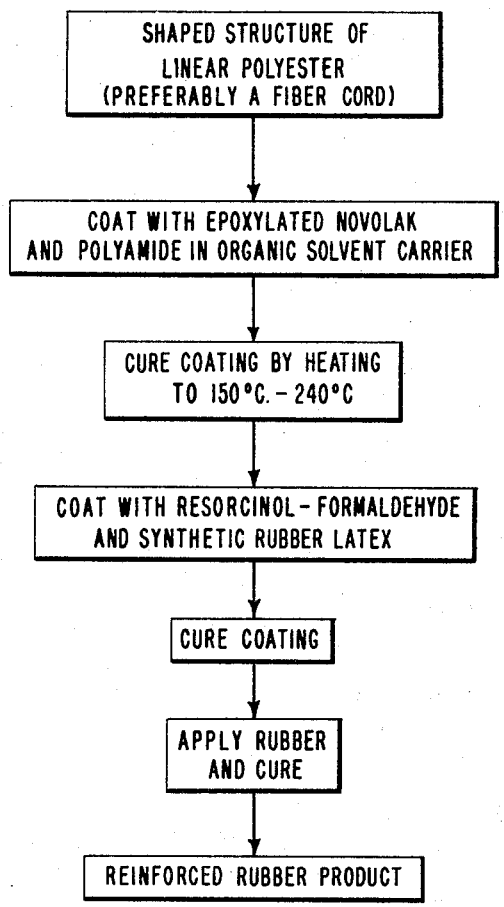

This invention relates to the treatment of fibrous material to improve its adhesion to rubber. More particularly it relates to a novel adhesive composition and method of application particularly suitable for synthetic linear condensation polyester fibers.

In contrast to the naturally occurring polymer fibers such as cotton and the older synthetic fibers such as nylon, the new polyester fibers have been found particularly difficult to bond to rubber. The outstanding properties of polyethylene terephthalate fibers, and their commercial availability, have made it highly desirable that a good polyester-to-rubber adhesive be developed. A number of such adhesives have been proposed, but none of these has been found fully satisfactory in certain critical applications.

The present invention provides a novel adhesive system and process of bonding synthetic polyester materials to rubber with good bond strength both at low and at high temperatures. Furthermore, the invention is particularly suitable for the preparation of "raw-edge" V-belts reinforced with polyester cords where a coherent cord structure highly resistant to fraying is required. The invention has the added advantage of providing adhesion to a wide variety of rubber stocks.

In accordance with the present invention, a synthetic polyester shaped structure is pretreated wtih an organic solvent solution containing dissolved therein 0.5% to 20%, by weight of the solution, of (A) an epoxylated novolak resin having an average of at least 2 epoxy groups per molecule, an average molecular weight above about 540 and an epoxide equivalent within the range of 200 to 300, and (B) a polyamide resin reaction product of dimerized vegetable oil unsaturated fatty acids and polyalkylene polyamines, wherein the weight ratio of (A) to (B) falls in the range of 80/20 to 20/80, and preferably in the range of 70/30 to 45/55. The liquid coating is heated to evaporate the solvent and cure at a temperature in the range of 150° C. to 240° C. for a curing time of 45 seconds to 5 minutes depending upon the temperature.

This procedure provides a precoated shaped structure bearing a coating of the reaction product of (A) with (B) constituting from about 0.5 to about 20% by weight of the coated structure. The coating composition is applied to the polyester shaped structure by any conventional means including dipping, spraying, brushing, padding or the like with the structure relaxed or under tension.

The precoated structure is then overcoated with an aqueous resorcinol-formaldehyde synthetic-rubber latex adhesive mixture, which is dried and cured, whereupon the structure is ready for bonding to rubber in conventional fashion.

Figure 2:
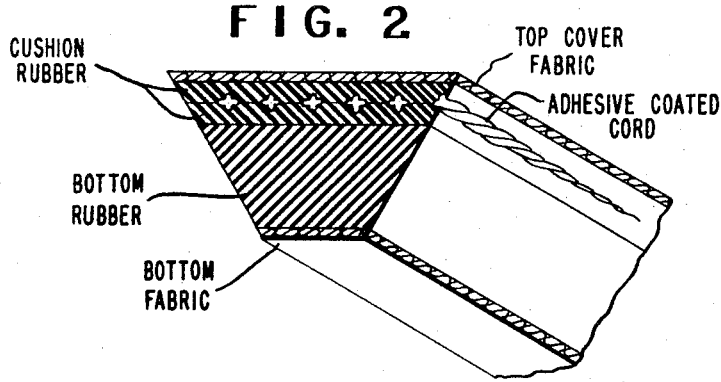

In the drawing, which illustrates specific embodiments of the invention,

FIGURE 1 is a flowsheet of the steps of applying and curing coatings on a fiber cord, or other shaped structure, in the preparation of a reinforced rubber product, and FIGURE 2 is an isometric view of a portion of V-belt, cross-sectioned at right-angles to the long axis of the belt, to illustrate the structure produced as in Example III.

As will be seen by following the various steps outlined in FIGURE 1, the polyester cord is coated with an organic solvent solution of an epoxylated novolak and a polyamide resin, which coating is thereafter cured by heating to a temperature of 150° C. to 240° C. A second coating of resorcinol-formaldehyde synthetic-rubber latex mixture is applied and cured and then the rubber is applied and cured to give a reinforced shaped product.

The term "epoxylated novolak resin" is intended to refer to the reaction product obtained by treating a non-heat-hardenable phenol-formaldehyde condensation product with epichlorohydrin. Epoxylated novolaks and methods for their preparation are described by Hanson and Ringwald in British Patent No. 746,824 published Mar. 21, 1956. Such novolaks are also described by Lee and Neville in "Epoxy Resins" (McGraw-Hill, New York, 1957), page 18. An idealized structural formula for an epoxylated novolak particularly suitable for the present invention is:

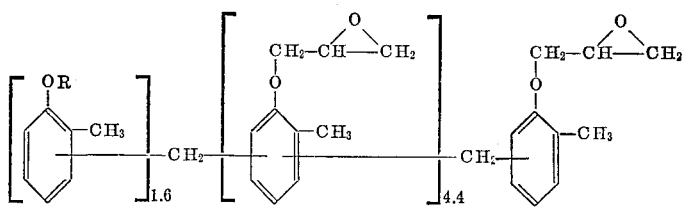

where R may be a chlorohydrin, glycol, or polymeric ether radical. Best results are obtained with an average molecular weight of 1100 to 1500, an oxirane oxygen content of 5% to 10% by weight, and an epoxide equivalent of 210 to 260.

The term "polyamide resins" as used herein refers to a class of resins prepared by reacting polymeric fat acids having at least 2 carboxyl groups, with polyalkylene polyamines containing two primary amine groups and a pluraliy of secondary amine groups separated by alkylene groups. The polymeric fat acids are prepared by polymerizing drying or semi-drying vegetable oils or the corresponding fatty acids of 12 to 22 carbon atoms, such as linoleic or oleic acids. Suitable types of vegetable oils include soybean, linseed, tung, perilla, oiticica, cottonseed, corn, tall, sunflower, safflower, and dehydrated castor oil. Polymeric fat acids are typically dimerized mixtures of acids which contain a smaller quantity of trimeric or higher polymeric acids and some residual unpolymerized acid. The preparation of polyamide resins is described by Floyd in "Polyamide Resins" (Reinhold Publishing Corporation, New York, 1958), page 25; by Lee and Neville in "Epoxy Resins" (McGraw-Hill, New York, 1957), page 166; and by Renfrew and Wittcoff in U.S. Patent No. 2,705,223 dated March 29, 1955.

The polyamide resins used in the present invention are liquid at room temperature and contain sufficient free amine groups to have an amine value of at least 200 milligrams per gram of polyamide. Preferably the amine value is 290 to 320. The amine value is determined by titration with HCl and calculated as the milligrams of KOH equivalent per 1 gram of resin.

It is important that the novolak and polyamide resins be applied from solution in a volatile organic solvent. Any organic solvent for the two components, which is volatile and non-reactive under the conditions of application, can be used. Readily available organic solvents include acetone, chloroform, trichloroethylene, toluene, ethylene chloride, ethylene glycol monoethyl ether, and mixtures thereof such as toluene mixed with ethylene glycol monoethyl ether. Aqueous dispersions are not suitable. An organic solvent solution provides much higher levels of adhesion, and there is also much better penetration of cord structures to provide the highly coherent structure necessary for the successful preparation of acceptable raw-edged V-belts. By "raw-edged V-belts" is meant those V-belts which do not have a complete woven fabric covering. Such belts are usually made by building a wide belt and then cutting it into a plurality of narrower belts, with the result that longitudinal sections of the internal reinforcing cords are exposed at the cut surfaces.

The invention will be better understood from the examples, which illustrate some of the suitable embodiments, methods of carrying out the invention and advantages obtained. In these examples, the strength of the adhesive is determined by the "single-end strip adhesion test" (SESA). In preparing samples for the single-end strip adhesion test, lengths of treated cord are placed in the bottom of a steel mold, the cords being parallel with a spacing of one inch between cords. The cords are placed under dead-weight tension to maintain their position. A sheet of unvulcanized compounded elastomer stock, 125 mils in thickness, is placed over the cords, covered with a cotton duck reinforcing backing, and the top plate of the mold placed over the back. The mold is put into a platen press. A pressure of approximately 150 pounds per square inch is applied and the mold is usually heated to about 145° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly imbedded in the cured elastomer stock, but are visible on the surface. This sheet is cut into 1" wide strips, each having a cord in the center of its width. The cord end is separated from one end of the strip; the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord. For determination of hot adhesion, the sample is brought to a temperature of 140° C. and held there while the cord is stripped from the elastomer sheet.

The RFL adhesive mixture of Examples I and II is prepared by mixing 1.38 parts by weight of resorcinol, 2.02 parts of 37% formaldehyde, 2.39 parts of 8.5% aqueous sodium hydroxide, and 27.8 parts water. This mixture is aged for six hours at 75–78° F. and then added to a mixture of 30.5 parts of 41% solids butadiene/styrene/vinylpyridine (in a mole ratio of 70/15/15) terpolymer latex diluted with 7.64 parts water. The final mixture is allowed to age for 12 hours before using. After applying it to the shaped structure, the RFL mixture is cured at 190° C. to 245° C., preferably 205° C. to 212° C., for 30–90 seconds with an applied stretch of −2% to +5%. Usually the dry solids pickup in this step in tire cord treatment ranges from about 2% to 7% by weight based upon the weight of the original cord.

The treated polyester structure may be bonded to rubber stocks of various types such as vulcanizable natural and synthetic rubbers including the butadiene polymers and copolymers with styrene, acrylonitrile, the vinyl pyridines and the like, as well as polymers of chloroprene and isoprene and combinations of two or more of such materials. In commercial applications the rubber stocks usually include reinforcing agents, pigments, vulcanizing materials, accelerators, antioxidants, and the like.

In the following examples, which illustrate specific embodiments within the scope of the invention, parts and percentages of materials are by weight.

Example I

An adhesive mixture is prepared by dissolving in 100 parts by weight of acetone, 2 parts of an epoxylated novolak resin having a softening point of 99° C., an average molecule weight of 1,270, an oxirane oxygen content of 6.6–7.0% by weight and an epoxide equivalent of 235. To the solution is added 1 part of a liquid polyamide resin prepared from linoleic acid dimer and a polyalkylene polyamine. The polyamide resin has an amine value of 290 to 320 milligrams per gram (milligrams of KOH equivalent to base content of 1 gram of polyamide as determined by titration with HCl).

A polyethylene terephthalate cord of 840 denier (93 tex), 2-ply construction, is dipped in the above-prepared adhesive mixture, dried at 93° C. for one minute, and then run through an oven at 220° C. under an applied stretch of 2% with an exposure time of one minute. The treated cord is then dipped in the RFL adhesive mixture described previously and again heated for one minute at 220° C. while undergoing an applied stretch of 2%. The total weight of adhesive coating on the cord, determined by weight increase during processing, is 4% based upon weight of greige cord.

The treated cord structure is found to be stiff and remarkably coherent. Cutting the cord diagonally does not product loose or frayed ends. Such a structure is considered ideal for the preparation of raw-edged V-belts.

The experiment is repeated using trichloroethylene as the solvent instead of acetone to give a second test sample.

Adhesive-treated cords prepared above are tested for adhesion in the single-end strip adhesion test using both a neoprene rubber stock and a natural rubber stock having the following composition:

| | Parts by weight |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

The adhesion test results are summarized in the following table.

TABLE

| Sample No. | Solvent | SESA (lbs.) | | |
|---|---|---|---|---|
| | | Natural rubber | | Neoprene |
| | | 24° C. | 140° C. | 24° C. |
| 1 | Acetone | 4.8 | 3.1 | 4.8 |
| 2 | Trichloroethylene | 4.3 | 3.0 | 6.3 |

In the same SESA test, cords treated only with the RFL adhesive mixture give test values of less than 1.0 pound.

Example II

An adhesive mixture is prepared by dissolving in 96 parts acetone, 4.4 parts of the epoxylated novolak described in Example I, and adding 4.4 parts of the liquid polyamide resin described in Example I dissolved in 96 parts methanol. The liquid mixture is then applied to a fabric woven from polyethylene terephthalate fibers, dried and then cured for one minute at 200° C. to give a total solids pickup of 2% by weight, based on weight of coated fabric.

The treated fabric is then further coated with the RFL mixture described previously, and cured for 2 minutes at 200° C. to give a total solids pickup in both layers of 11% by weight. The treated fabric is bonded to a sheet of natural rubber of the type described in Example I by heating under pressure at 157° C. for 30 minutes, and cut into one-inch-wide strips for testing. The test consists of measuring the tension developed during the stripping of fabric from rubber. The test is carried out at 145° C. and an average tension of 59 pounds is measured during the stripping operation.

In control tests carried out in a similar manner but modified by the use of the novolak resin alone or the polyamide resin alone as a first coating mixture, rather than a combination of the two, it is found that fabric strip adhesion values at 145° C. are about 3 pounds per inch of width for the novolak resin and no higher than about 10 pounds per inch of width for the polyamide resin.

Example III

This example illustrates the preparation of a raw-edged V-belt from cords coated with the adhesive of this invention.

An adhesive mixture is prepared by mixing 3 parts of the epoxylated novolak described in Example I, 1.5 parts of the liquid polyamide resin described in Example I, and 95.5 parts of toluene. A polyethylene terephthalate V-belt cord of 1100/2/5 construction is dipped in the toluene solution and heated to 94° C. to evaporate the solvent, leaving a dry solids coating on the cord of 1.5% by weight. The treated cord is then hot-stretched in an oven at 218° C. while undergoing a 3% applied stretch. Exposure time is 90 seconds. This cord is then further dipped in an RFL mixture prepared by adding a mixture of 7.37 parts of resorcinol, 4.0 parts of 37% formaldehyde, and 14.8 parts of water which has been aged for 1 hour at 24° C., to 24.0 parts of 41% solids butadiene/styrene/vinyl pyridine (70/15/15) terpolymer latex diluted with 23.9 parts water, and the final RFL mixture is aged for 4 days before using. After dipping in the RFL mixture the cord is heated at 232° C. for 90 seconds while maintaining its length constant. Dry RFL solids pickup is 2.5% of the weight of the original cord. The cord has become a stiff, coherent structure.

The adhesive-treated cord is tested for adhesion to rubber in the single-end strip adhesion test using a neoprene rubber stock and found to give an SESA value of 30 pounds at room temperature. Failure is by tearing of the rubber rather than failure of the adhesive interface.

Following well-known techniques for preparing raw-edged V-belts, a cover fabric is wound on a collapsible, cylindrical building drum and covered with a sheet of neoprene "bottom rubber" calendered to the proper thickness. A thin sheet of neoprene "cushion rubber" is then wound on the drum to cover the bottom rubber. Next the building drum is rotated and the adhesive-coated cord prepared above is wound on top of the cushion rubber in a spiral fashion by feeding it from a supply head traveling parallel to the axis of the drum. A single layer of closely-spaced side-by-side cords is applied, and this is then covered with a second layer of neoprene cushion rubber which is applied and rolled down with a roller. Finally, the V-belt top-cover fabric is applied. The drum is then removed from the building machine and placed in an autoclave to cure the belt assembly. After curing, the belt assembly is removed from the building drum and placed on a mandrel for cutting. By rotating the mandrel against a pair of stationary knife blades, the 2-foot-wide belt assembly is cut into individual raw-edged V-belts having a top width of ⅜ inch. The resulting structure is illustrated in FIGURE 2.

V-belts prepared as above are tested on a 3-pulley dynamometer stand at 4900 r.p.m. with a load of 70 lbs. on the idler pulley. The belts show no cord fraying along the cut edge, and no loss of power transmission due to cord fraying can be observed. The belt fails by elastomer and cord fatigue rather than by adhesion failure.

The process of the invention may be applied to the treatment of any fibrous material useful in the reinforcing of rubber products, such as cotton, rayon, nylon, and the like. However, especially valuable results are obtained when the invention is applied to polyester fibers, cords, and other shaped structures such as those prepared from polyethylene terephthalate, because of the inadequacy of previously known adhesive systems. Illustrative of the polyesters useful in preparing fibers, films or other shaped structures which may be bonded to rubber by the process of this invention are those disclosed in U.S. Patents No. 2,465,319, No. 2,965,613, and No. 2,901,466.

Since many different embodiments of the invention may be made without departing from the spirit and scope thereof, it is to be understood that the invention is not limited by the specific illustrations except to the extent defined in the following claims.

I claim:

1. In the production of raw-edged V-belts which includes building a wide rubber belt having internal reinforcing filamentary polyester cords bonded to the rubber and then cutting the wide belt into a plurality of narrower belts whereby longitudinal sections of the cords are exposed, the improvement in the bonding of polyethylene terephthalate filamentary cords to the rubber to provide raw-edged V-belts reinforced with coherent polyester cords highly resistant to fraying at the raw edges; wherein the improvement comprises (1) coating the cords with a volatile organic solvent solution containing dissolved therein 0.5% to 20%, by weight of the solution, of
   (A) an epoxylated novolak resin that is the reaction product of a non-heat-hardenable phenol-formaldehyde condensation product with epichlorohydrin having an average of at least 2 epoxy groups in each molecule, an average molecular weight above about 540 and an epoxide equivalent within the range of 200 to 300, and
   (B) a polyamide resin reaction product of polymeric fat acids having at least two carboxyl groups and polyalkylene polyamines having two primary amine groups and a plurality of secondary amine groups, the polyamide resin being liquid and having an amine value of at least 200, and wherein the weight ratio of (A)/(B) is from 80/20 to 20/80;

(2) heating the coated cords to a temperature of 150°

C. to 240° C. to evaporate the organic solvent and cure the coating;

(3) overcoating the cords with an aqueous resorcinol-aldehyde and butadiene-vinyl pyridine latex mixture;

(4) drying and curing the overcoating; and (5) applying and curing a layer of rubber on the coated cords.

2. The process as defined in claim 1 wherein the epoxylated novolak resin (A) has a molecular weight of 1100 to 1500, an oxirane oxygen content of 5% to 10% by weight, and an epoxide equivalent of 210 to 260.

3. The process as defined in claim 1 wherein the polyamide resin (B) has an amine value of 290 to 320.

4. The process as defined in claim 1 wherein the coating produced by steps (1) and (2) constitutes from about 0.5% to 20% by weight of the coated cord.

5. The process as defined in claim 1 wherein the overcoating applied to steps (3) and (4) is an aqueous resorcinol-formaldehyde and butadiene/styrene/vinylpyridine (70/15/15) terpolymer latex and the resulting overcoating is about 2% to 7% of the weight of the original cord.

References Cited

UNITED STATES PATENTS

| | | | |
|---|---|---|---|
| 2,773,540 | 12/1956 | Waugh | 156—142 X |
| 2,902,398 | 9/1959 | Schroeder | 156—315 |
| 2,909,204 | 10/1959 | Somerville | 161—184 |
| 2,962,468 | 11/1960 | Groves | 260—42 |
| 3,036,948 | 5/1962 | Danielson. | |
| 3,136,681 | 6/1964 | Johnston | 161—190 |
| 3,190,764 | 6/1965 | Cardina | 117—62.2 |
| 3,222,238 | 12/1965 | Krysiak | 156—330 |
| 3,247,043 | 4/1966 | Cardina | 156—314 |

EARL M. BERGERT, *Primary Examiner.*

C. B. COSBY, *Assistant Examiner.*

U.S. Cl. X.R.

117—72; 156—110, 142, 330, 331; 161—184, 257; 260—2